United States Patent [19]

Harder

[11] Patent Number: 4,553,720
[45] Date of Patent: Nov. 19, 1985

[54] CONNECTING MECHANISM FOR AN AIRPLANE PASSENGER BRIDGE

[75] Inventor: Helmut Harder, Kassel, Fed. Rep. of Germany

[73] Assignee: Thyssen Industrie Aktiengesellschaft, Essen, Fed. Rep. of Germany

[21] Appl. No.: 523,694

[22] Filed: Aug. 16, 1983

[30] Foreign Application Priority Data

Mar. 31, 1983 [DE] Fed. Rep. of Germany ... 8309614[U]

[51] Int. Cl.[4] ............................................. B64D 9/00
[52] U.S. Cl. ................................. 244/137 P; 14/71.5
[58] Field of Search ..................... 244/137 P; 14/69.5, 14/71.1, 71.3, 71.5, 71.7; 296/179; 52/126.1, 126.5, 126.6, 173 DS; 105/8 R; 414/396, 401

[56] References Cited

U.S. PATENT DOCUMENTS

| | | | |
|---|---|---|---|
| 3,179,968 | 4/1965 | Lambert | 14/71.7 |
| 3,561,030 | 7/1969 | Seipos | 14/71.5 |
| 3,599,262 | 8/1971 | Carder et al. | 414/401 |
| 3,693,204 | 9/1972 | Eggert, Jr. | 14/71.5 |
| 3,747,147 | 7/1973 | Weese | 14/71.5 |
| 4,020,517 | 5/1977 | Waddell | 14/71.5 |
| 4,110,859 | 9/1978 | Lichti | 14/71.5 |
| 4,318,198 | 3/1982 | Drozd | 14/71.5 |

Primary Examiner—Galen L. Barefoot
Assistant Examiner—Paul J. Bednar
Attorney, Agent, or Firm—Becker & Becker, Inc.

[57] ABSTRACT

A connecting mechanism for an airplane passenger bridge. The cabin of the passenger bridge can be connected with an aircraft, and can be placed against the aircraft by means of a circumferential seal which extends completely around the door of the aircraft. The cabin has a bottom which can be tilted about an essentially horizontal axis. The bottom of the cabin includes two different sections. The outer section faces the aircraft, can be horizontally positioned, and is embodied as an inclinable floor having a pivot axis disposed in the direction in which passengers walk. The inner section is rigidly embodied. Those ends of each of the two bottom sections which face one another are respectively provided with a triangular transition ramp which can be folded over, into or counter to the direction in which the passengers walk, about an axis which is parallel to the pertaining walking surface. The transition ramps are arranged next to one another, and in the position of use their undersides can be supported, in the region of their hypotenuses which are directed toward the middle of the passageway, on the respectively opposing bottom section.

5 Claims, 4 Drawing Figures

CONNECTING MECHANISM FOR AN AIRPLANE PASSENGER BRIDGE

BACKGROUND OF THE INVENTION

1. Field of the Invention

The present invention relates to a connecting or transition mechanism for an airplane passenger bridge (jetway). The cabin of the passenger bridge can be connected with an aircraft and may be placed against the aircraft by means of a circumferential seal which extends completely around the door of the aircraft. The cabin has a bottom which can be tilted about an essentially horizontal axis.

In order to make aircraft passengers comfortable, and in order to transport them between the airport terminal and the aircraft in such a way that they are protected from weather and other environmental influences, single or multitunneled passenger bridges are used which can be telescoptically extended and the height of which is adjustable.

2. Description of the Prior Art

A single-tunnel aircraft passenger bridge of this general type is disclosed, for example, in German Pat. No. 1 253 157. The bottom region of the cabin, which is to be placed against the aircraft, is pivotably mounted about a horizontal axis which is disposed transverse to the longitudinal direction of the adjacent tunnel-like section. The top of the cabin is hinged to the support structure. This support structure enables the cabin to be pivoted about the transverse axis in such a way that the bottom of the cabin is always disposed horizontally regardless of the inclination of the tunnel-like section at any given time. Due to the fact that the cabin is disposed at right angles to the tunnel-like section, this heretofore known aircraft passenger bridge has the drawback that it can only be used when aircraft are parked on the apron at certain angles to the terminal. Furthermore, due to the limited freedom of movement of these heretofore known connecting mechanisms, the formation of a gap between the threshold of the door of the airplane and the bottom of the cabin cannot always be avoided. As a result, a complete sealing-off can also not always be assured.

It is therefore an object of the present invention to provide a connecting mechanism of the aforementioned general type which satisfies requirements at level and downwardly slanted positioning of the cabin, and affords a safe passage for the passengers over the entire width of the cabin.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

The connecting mechanism of the present invention is characterized primarily in that the bottom of the cabin comprises two different sections. The outer section faces the aircraft, can be positioned horizontally, and is embodied as an inclinable floor having an axis of pivot which is disposed in the direction in which passengers walk. The inner section is rigidly embodied. Those ends of each of the two bottom sections which face one another are respectively provided with a triangular transition ramp. Each transition ramp can be folded over, into or counter to the direction in which the passengers move, about an axis which is parallel to the pertaining walking surface. The transition ramps are arranged next to one another, and in the position of use, their undersides, in the vicinity of their hypotenuses which are directed toward the middle of the walking path, can be supported on the respectively opposing bottom section.

Due to the specific construction of the inventive connecting mechanism, the outer section of the two-part cabin bottom, which outer section faces the aircraft, can be positioned not only at the respective height of the threshold of the door of the aircraft, but also parallel thereto, so that it is possible to avoid a wide, for example wedge-shaped, gap and/or an insufficient sealing arrangement in the transition region between the cabin and the aircraft. Furthermore, the inventive connecting mechanism assures that the gap between the two bottom sections of the cabin is bridged by the transition ramps, which are placed at an angle to compensate for possible differences in height in the operating position; in this way, the formation of steps where a person could stumble is precluded.

Pursuant to further advantageous and expedient refinements of the present invention, the pivot axis of the inclinable outer section of the bottom of the cabin may be centrally disposed thereon. The inclinable outer section of the bottom of the cabin may have an eccentrically located holding member which is linked with a spindle nut of a self-locking spindle drive which is vertically mounted on the wall of the cabin externally of the entrance way. The spindle drive may be operated manually or with a motor.

DESCRIPTION OF A PREFERRED EMBODIMENT

Figure 1:
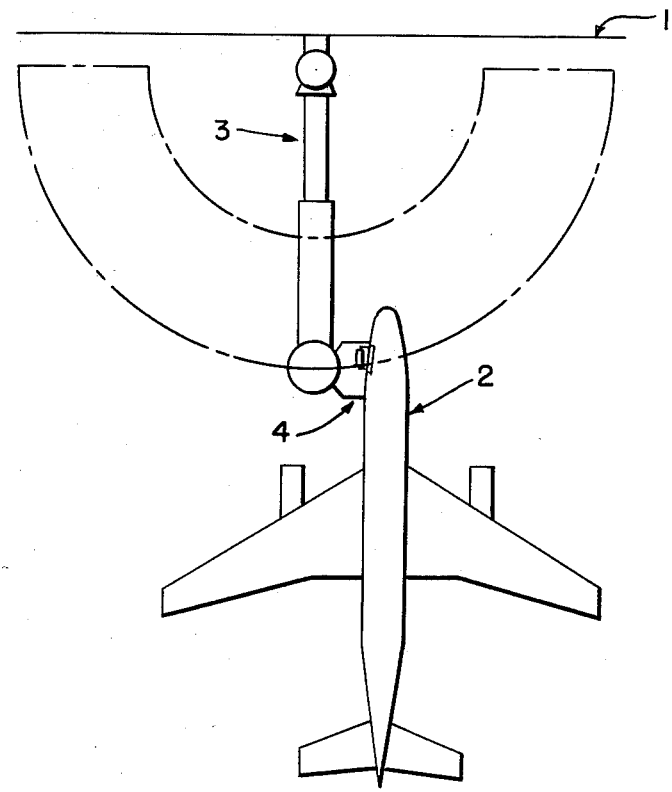
FIG. 1 is a plan view schematically illustrating an airplane passenger bridge between an airport terminal and an aircraft.

Referring now to the drawings in detail, FIG. 1 schematically illustrates an airplane passenger bridge or jetway 3 which connects an airport terminal 1 with an aircraft 2 for the boarding and deplaning of passengers. In order to adapt to the different possible positions of the aircraft relative to the terminal, the passenger bridge 3, on that side directed toward the aircraft, is provided with a rotunda (not shown in greater detail), and a cabin 4.

For engaging the aircraft, the end face of the cabin 4 is provided with a known overhanging canopy 5 which can be advanced over the floor of the cabin, and the bottom of the cabin is provided with a conventional elastic threshold 6. Both the canopy 5 and the threshold 6 are freely movable. In other words, they permit movement and effect sealing with the convex contour 7 of the body of the aircraft.

Figure 2:
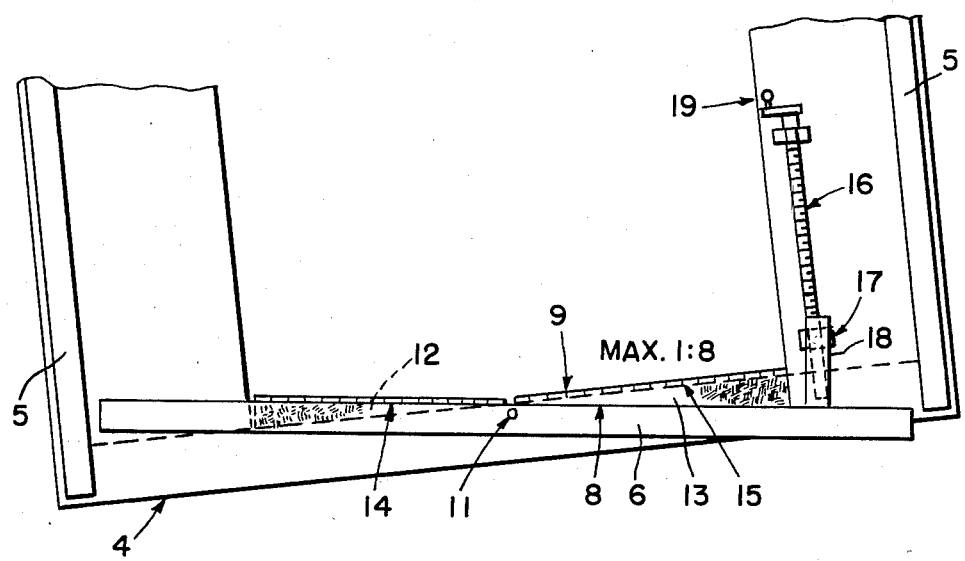
FIG. 2 is a partial view into one embodiment of the inventive cabin of the passenger bridge as viewed from the aircraft.
Figure 3:
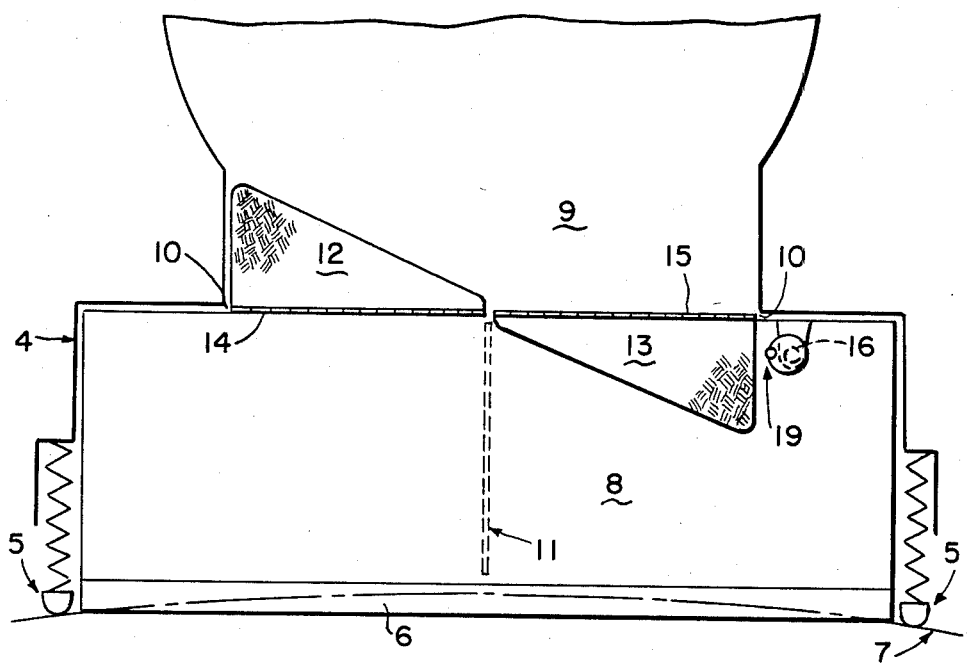
FIG. 3 is a plan view of the illustration of FIG. 2.

As shown in detail in FIGS. 2 and 3, the bottom of the cabin 4 is in two parts and comprises a rigidly disposed inner section 9, and a movable outer section 8 which is embodied as an inclinable floor and which is provided with the elastic threshold 6. A gap 10 is located between the outer and inner sections and permits a movement which is free of constraint of the outer section 8 relative to the inner section 9.

The outer section 8 of the bottom of the cabin 4 can be adapted to the threshold of the door of the aircraft, and can be swung or inclined about a central axis 11 which extends in the direction in which passengers move. As shown in FIG. 2, the outer section 8 can have a maximum inclination in a ratio of 1:8 relative to the passenger bridge 3, and hence the inner section 9, which are inclined toward the aircraft. The differences in height which result between the outer section 8 and the inner section 9 in the region of the gap 10 are bridged by two hinged and pivotable transition ramps 12 and 13 which are disposed next to one another and occupy nearly the entire width of the passageway. Each of the transition ramps 12, 13 is a triangular, plate-like part and is pivotably connected to one of the facing ends of the two bottom sections 8, 9 about a respective shaft 14, 15 which is disposed parallel to the walking surface of the pertaining bottom section 8, 9; the ramps 12, 13 can be pivoted either in or counter to the direction in which the passengers walk. The hypotenuses of the two transition ramps 12, 13 are directed toward the middle of the passage way. During use, the under side of each ramp 12, 13 is supported, in the vicinity of its hypotenuse, on the walking surface of the opposing bottom section 8, 9.

Both sides of the two transition ramps 12 and 13 are preferably provided with a non-slip surface and are identically embodied, so that they can be interchanged with one another.

The adjustment of the outer section 8 of the bottom of the cabin 4, which section 8 can be inclined about its axis of symmetry 11, is effected by means of a spindle drive 16 which is vertically mounted on the wall of the cabin externally of the entrance way. The spindle nut 17 of the drive 16 is linked with a holding member 18 which is eccentrically disposed on the outer section 8. The thread of the spindle end of the nut is self-locking, so that the bottom section 8 is held in every position. The spindle drive can either be manually operated by means of a crank 19 as shown in the illustrated embodiment, or it can be operated by a motor.

Figure 4:
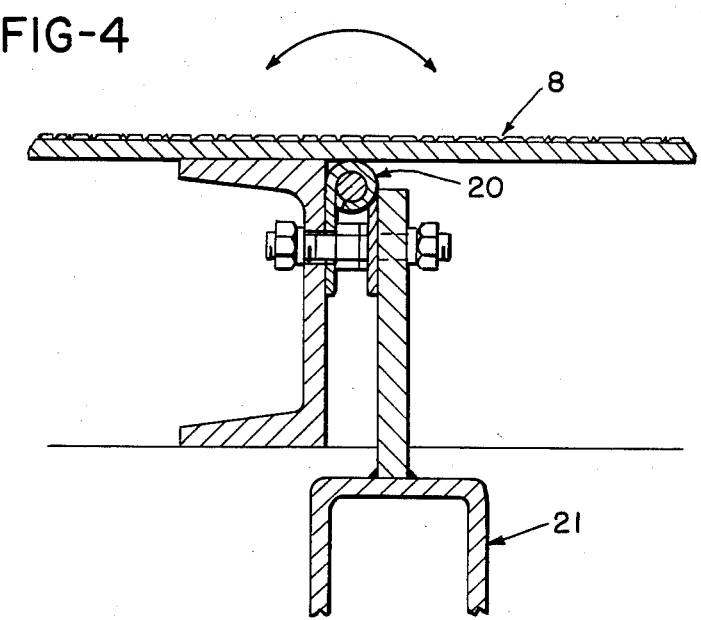
FIG. 4 is a detailed view, to a larger scale, of one possibility for mounting the inclinable bottom section of the cabin.

In the embodiment illustrated in FIG. 4, the inclinable bottom section 8 is mounted on an end piece 21 of the cabin 4 by means of a hinge joint 20.

The transition ramps 12, 13, for example, also can be connected to the bottom sections 8, 9 by means of hinge joints.

The present invention is, of course, in no way restricted to the specific disclosure of the specification and drawings, but also encompasses any modifications within the scope of the appended claims.

What I claim is:

1. A connecting mechanism for an airplane passenger bridge which provides a passageway for passengers who are boarding or deplaning an aircraft having a door; said connecting mechanism comprising:
    a cabin which can be connected to said aircraft and which has a circumferential seal for placement against said aircraft is such a way as to extend completely around the door thereof; said cabin having a bottom which is in two different parts, namely a tiltable outer section which is adapted to face said aircraft, and a rigid inner section; said outer section being arranged capable of being positioned horizontally, and being embodied as an inclinable floor having an essentially horizontal pivot axis which is disposed in the direction in which passengers walk; each of said sections of said bottom of said cabin having an end which is directed toward the other of said bottom sections; and
    one triangular transition ramp provided on each of said ends of said bottom sections which face one another; said transition ramps being disposed next to one another, and each capable of being selectively folded over about a transverse axis, into and out of the direction in which passengers normally walk, located in spaced parallel relationship to the pertaining walking surface; when in use, the hypotenuse region of that side of each transition ramp which faces downwardly being directed toward the middle of the passageway and being supported on that bottom section to which the pertaining transition ramp is not connected.

2. A connecting mechanism according to claim 1, in which said pivot axis of said inclinable outer cabin bottom section is centrally disposed thereon.

3. A connecting mechanism according to claim 1, which includes: a self-locking spindle drive, which includes a spindle nut and is vertically mounted on a wall of said cabin externally of the passageway; and a holding member eccentrically mounted on said inclinable outer cabin bottom section, said holding member being linked with said spindle nut.

4. A connecting mechanism according to claim 3, in which said spindle drive can be operated manually.

5. A connecting mechanism according to claim 3, in which said spindle drive can be operated with a motor.

* * * * *